United States Patent [19]

Burks

[11] 4,060,111
[45] Nov. 29, 1977

[54] VENDING AND DISPENSING BIN
[75] Inventor: Howard L. Burks, Dunedin, Fla.
[73] Assignee: Perino B. Wingfield, Yellow Springs, Ohio ; a part interest
[21] Appl. No.: 640,890
[22] Filed: Dec. 15, 1975
[51] Int. Cl.² ............... B65B 3/00; B65G 11/18; G01F 11/20
[52] U.S. Cl. .............................. 141/231; 141/391; 198/616; 222/252; 222/368; 222/415
[58] Field of Search ............ 221/76, 79, 81, 88; 222/415, 368, 252; 198/616, 574, 598, 599; 141/391, 231

[56] References Cited
U.S. PATENT DOCUMENTS

| | | | |
|---|---|---|---|
| 1,791,362 | 2/1931 | LaForge | 222/415 X |
| 1,927,318 | 9/1933 | McEntee et al. | 198/616 X |
| 3,045,719 | 7/1962 | Burks et al. | 222/368 X |
| 3,477,559 | 11/1969 | Raasch | 198/616 X |

FOREIGN PATENT DOCUMENTS 1,359,246   3/1964   France .................. 222/415

Primary Examiner—Stanley H. Tollberg
Assistant Examiner—Hadd S. Lane
Attorney, Agent, or Firm—Jerome P. Bloom

[57] ABSTRACT

This invention provides vending and dispensing apparatus comprising a housing having a bin section and a dispensing section separated by a belt type conveyor. The conveyor embodies means which in the movement thereof serve not only to influence elements of a conglomerate mass of material stored in the bin section to separate one from the other but to carry elements of the separated material to the dispensing section for their discharge in a relatively individualized form.

The invention also features a mobile dispensing unit which may be be backed up to receive the discharge from the dispensing section of the above described housing and moved to deliver measured amounts of the material to a plurality of remote stations. The mobile unit embodies a storage type receiving chamber having a movable bottom wall structure including a pocket which accommodates a measured amount of the material delivered to the storage chamber. Below the bottom wall structure of said chamber is a chute means which, on an appropriate movement of the bottom wall structure, is adapted to receive the charge contained in said pocket and to direct the same to a removable receptacle placed in a bottom chamber of the mobile unit.

16 Claims, 9 Drawing Figures

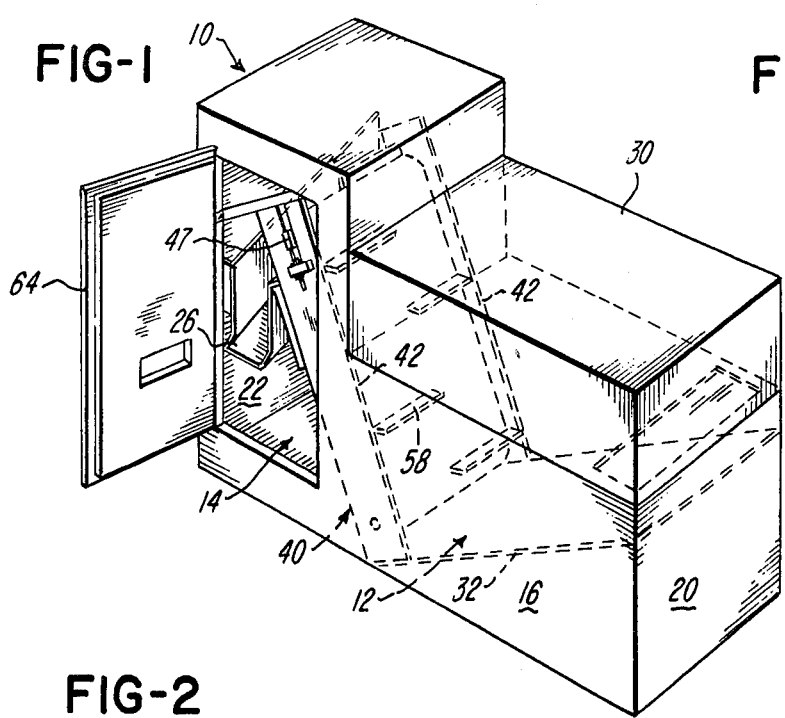
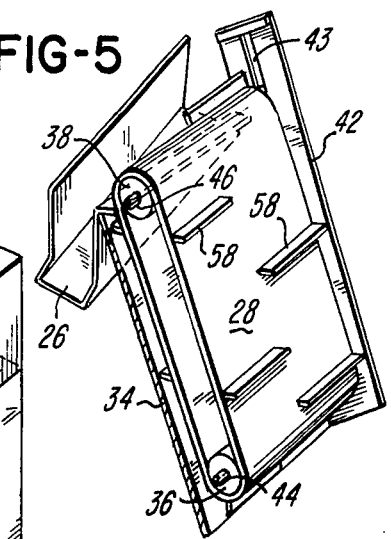
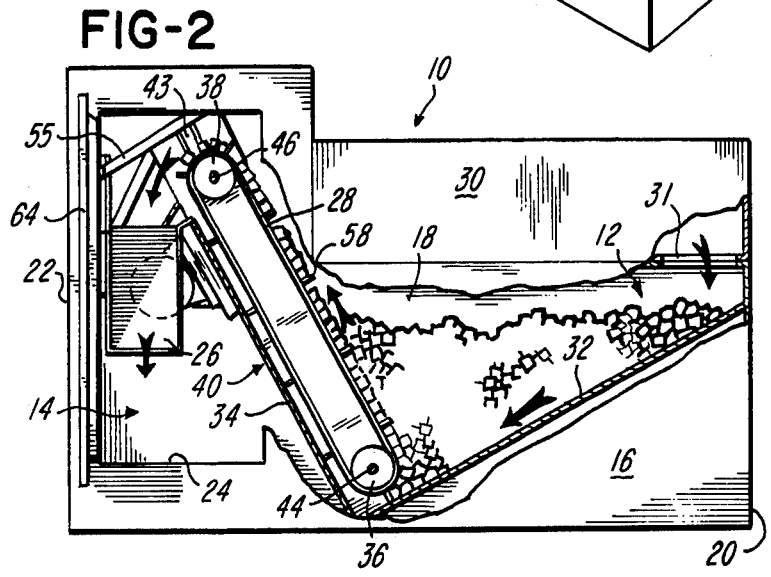
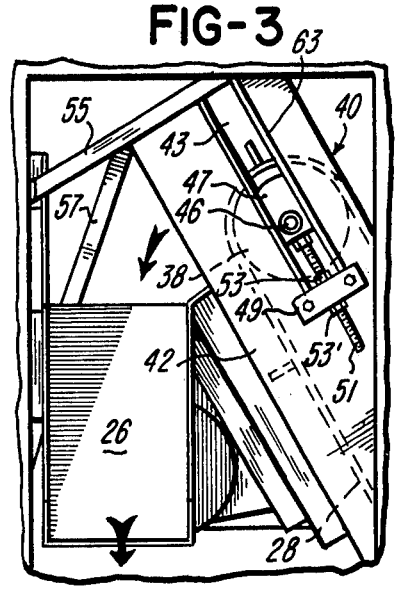
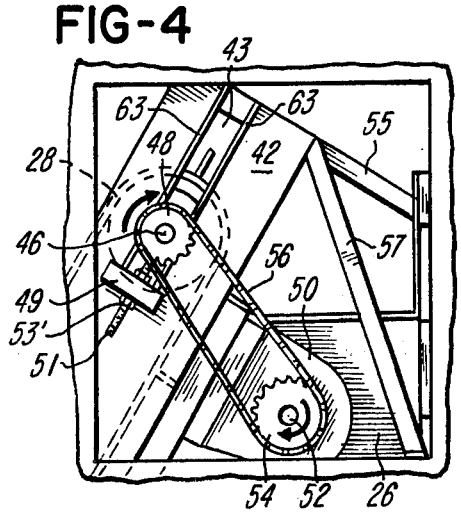
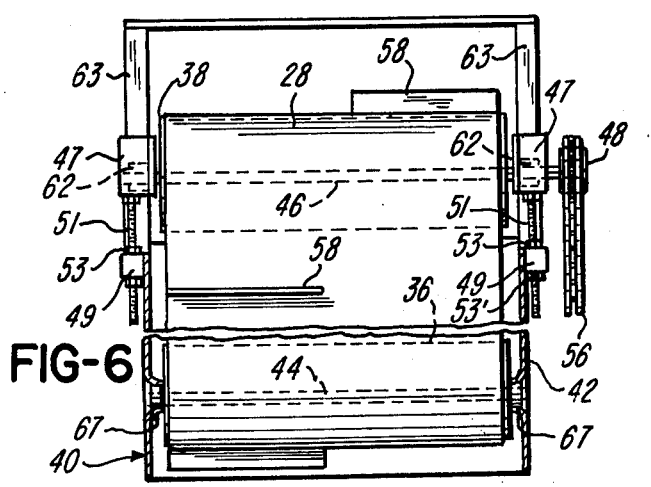

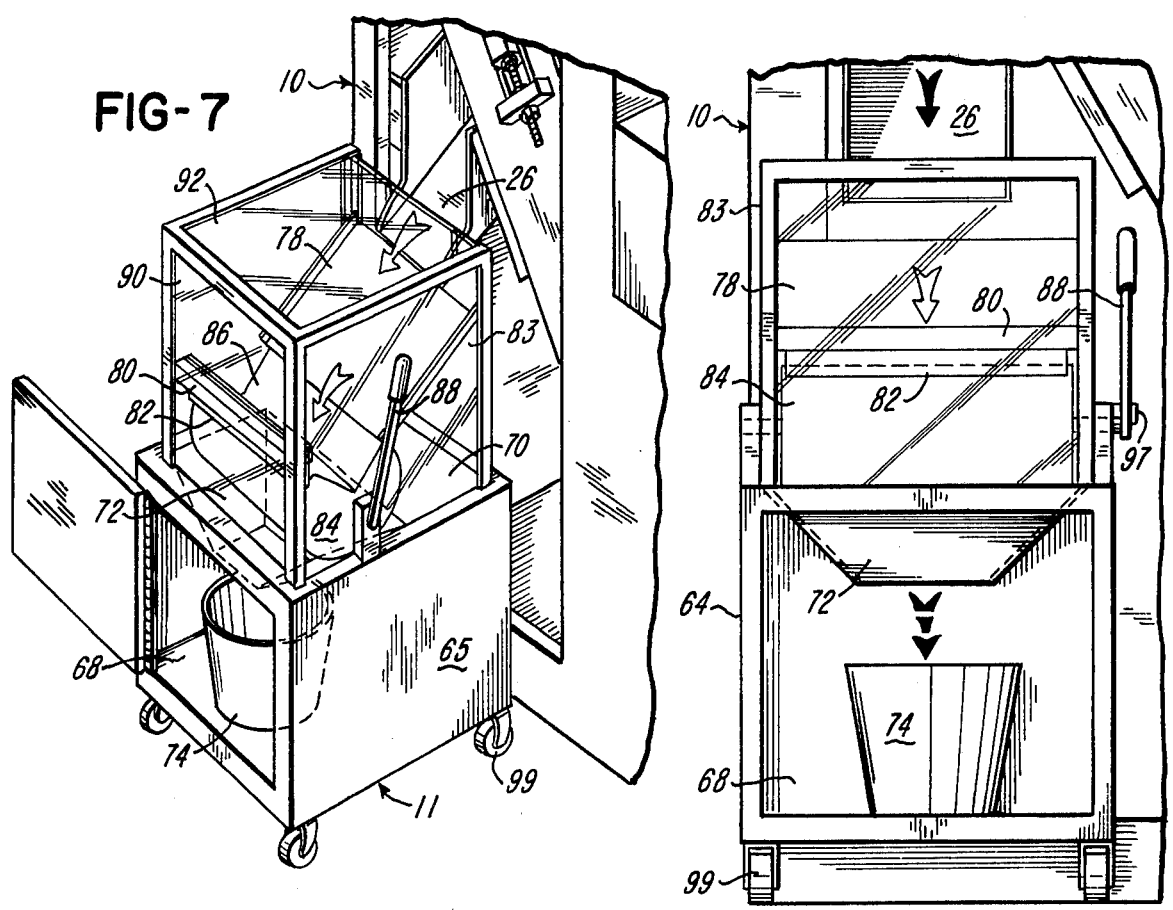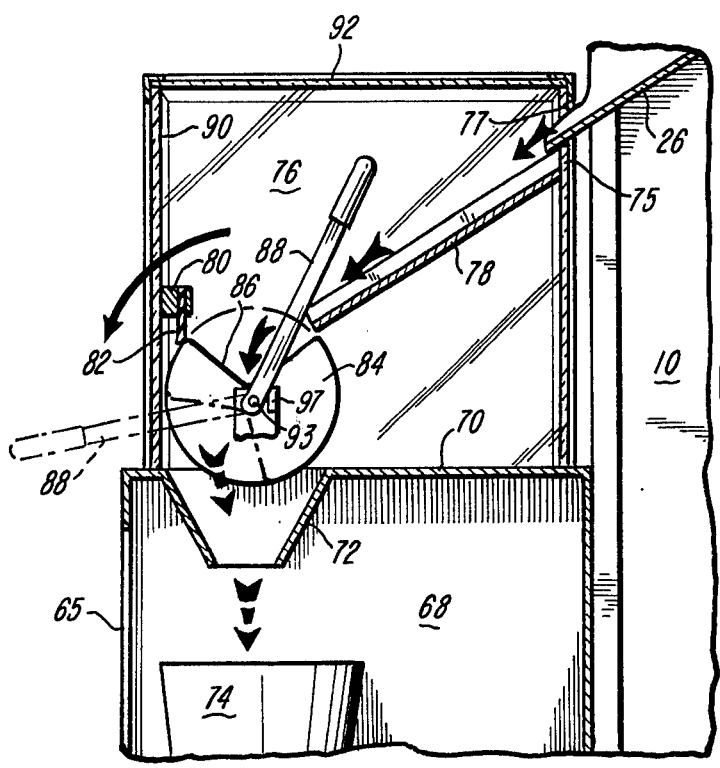

VENDING AND DISPENSING BIN

BACKGROUND OF THE INVENTION

This invention relates to improvements in vending and dispensing bins for use in storage and dispensing of elements of materials which are deposited in a conglomerate mass. It has particular advantage in application to the handling and dispensing of ice cubes and will be so described, but only for purposes of illustration. Its application is not so limited and such is not intended.

Much difficulty has been experienced in the use of the means and methods heretofore available for the storage and dispensing of ice cubes. Such items are in frequent and great demand, particularly in installations having the character of motels, hotels and hospitals. As heretofore known and practiced in such installation, bins are provided on the premises, into which bins ice cubes are dumped and stored as a conglomerate mass of material. When the ice cubes so stored are required for use as individual cubes, the conventional arrangement provides that the cubes are normally extracted from the bin by hand or by means of a hand manipulated scoop. The system so provided for storing and handling the cubes is extremely unsatisfactory. Unsanitary conditions prevail not only by reason of the fact that disease may be transmitted by the application of the many hands which are inserted in the bin to acquire ice cubes but by reason of the further fact that the arrangement normally provides that the bin must be open wide in each instance a supply of the cubes is required. This last exposes the cubes to the prevailing dirt and unsanitary conditions of the environment which surrounds the bin. Oftentimes the user is careless and leaves the bin wide open, under which conditions foreign matter may easily reach and contaminate the cubes.

Adding to the foregoing problem in use of prior art storage and dispensing bins is the fact that the nature and character of the prior art bins and the use thereof, as dictated by their construction, many times produce conditions under which the cubes tend to slightly melt and to adhere to each other, even though the bin might itself be cooled or refrigerated. This last factor produces obvious difficulties in maintaining the cubes in an individualized form and makes it particularly difficult to readily extract and dispense the cubes in an optimal condition for use.

It will be obvious from the foregoing that the nature and character of the prior art apparatus for vending and dispensing ice cubes and similar materials leaves much to be desired and the use thereof can have serious undesirable consequences.

SUMMARY OF THE INVENTION

The present invention provides improvements in vending and dispensing bin structure enabling a system and apparatus which eliminates the above noted problems. As will be seen, embodiments of the invention are particularly advantageous for the storage and dispensing of ice cubes in hospital-type installations.

A preferred embodiment of the invention provides vending and dispensing apparatus comprising a housing unit including a bin section and a dispensing section wherein the bin section is connected to the dispensing section by an endless belt-type conveyor which forms one side wall portion of the bin section. The conveyor, as illustrated, embodies blade-like projections designed to apply twisting and agitating forces to the ice cubes which have been deposited in the bin section in a conglomerate mass as well as to provide means for conveying the ice cubes to the dispensing section in a relatively individualized form. As provided, the bin and dispensing sections of the housing are relatively sealed and in no instance are the ice cubes touched by hand or exposed to the surrounding environment until they are discharged from said housing by way of the dispensing section thereof.

Preferred embodiments of the invention are also characterized by a bin section the bottom wall of which is designed to incline downwardly to the lower end of the endless belt-type conveyor. This inclination is at an acute angle to a horizontal and provides, preferably, that the bottom material supporting surface of the bin forms an angle with the material conveying surface of the conveyor belt in the neighborhood of 90°.

In providing an optimal system for use in hospital type installations, the invention also provides a portable receiving unit. The latter is designed to be backed up to receive, in a trough-like upper portion thereof, the ice cubes which are discharged from the dispensing section of the housing unit above described. The trough-like upper portion of the portable unit includes a bottom wall structure the uppermost surface of which is formed to include a pocket designed to accommodate a measured charge of ice cubes. As will be seen, this bottom wall structure is rotatable to direct the charge in its pocket to and through a dependent chute which opens at its bottom to a receptacle which can be removed for delivery of its contents to an individual at a station remote from the location of the main housing unit above described.

It is accordingly a primary object of the present invention to provide improved vending and dispensing structure which is generally economical to fabricate, more efficient and satisfactory in use, adaptable to a wide variety of applications and unlikely to malfunction.

A further object of the invention is to provide improved apparatus for storing ice cubes in a conglomerate mass embodying means for dispensing ice cubes in a generally individualized form and under sanitary conditions.

Another object of the invention is to provide improvements in available means and methods for handling and dispensing materials the storage of which must be effected in a conglomerate mass and under conditions which might cause elements of the material to adhere to each other during storage.

An additional object of the invention is to provide an improved vending and dispensing structure embodying a storage bin one side wall portion of which constitutes a material conveying means portions of which are arranged in the movement thereof to apply forces to the stored material which tends to influence the elements thereof to relatively free themselves, one from the other.

Another object of the invention is to provide improved apparatus and an improved system for the handling and dispensing of ice cubes and similar materials which is particularly useful in hospital, motel and hotel-type installations.

An additional object of the invention is to provide vending and dispensing apparatus possessing the advantageous structural features, the inherent meritorious characteristics and the means and mode of use herein described.

With the above and other incidental objects in view as will more fully appear in the specification, the invention intended to be protected by Letters Patent consists of the features of construction, the parts and combinations thereof, and the mode of operation as hereinafter described or illustrated in the accompanying drawings, or their equivalents.

Referring to the drawings, wherein some but not necessarily the only forms of embodiment of the invention are illustrated.

FIG. 1 is a perspective view of vending and dispensing apparatus in accordance with the present invention, details being omitted for clarity of disclosure;

FIG. 2 is a front elevation view of the apparatus of FIG. 1, parts being broken away and details being eliminated for clarity of disclosure;

FIG. 3 is a relatively enlarged view of a portion of the structure shown in FIG. 2;

FIG. 4 is a view similar to that of FIG. 3, taken from the rear of the structure illustrated in FIG. 3;

FIG. 5 is a generally diagrammatic illustration, in perspective, of the conveyor belt portion of the apparatus shown in FIGS. 1 and 2 and its association with the dispensing chute embodied in the dispensing section of the housing structure illustrated in FIGS. 1 and 2;

FIG. 6 is a generally diagrammatic sectional view illustrating the belt of FIG. 5 together with its drive and adjusting mechanism;

FIG. 7 is a perspective view of a mobile receiving unit in accordance with the invention as applied to receive materials discharged from the dispensing section of the housing structure of FIGS. 1 and 2;

FIG. 8 is a front elevation view of the structure shown in FIG. 7 wherein its access door is illustrated in an open condition; and FIG. 9 is a sectional view of the apparatus shown in FIGS. 7 and 8.

Like parts are indicated by similar characters of reference throughout the several views.

In the drawings, the primary features of the invention are embodied in a generally rectangular housing 10 including, in side by side relation, from right to left, a bin section 12 and a dispensing section 14. As seen in front elevation, the dispensing section 14 is narrower but substantially higher in vertical extent than the bin section 12 and the outer walls of the housing are appropriately formed. The housing walls comprise front and back walls 16 and 18 which are in a spaced parallel relation, a right side wall 20 which forms the outer side of the bin section 12 and a left side wall 22 which is parallel to the right side wall 20 and forms the remote side of the dispensing section 14. The vertically extended portion of the wall 16 which provides the front wall portion of the section 14 has an opening 24 at which is presented the lower discharge end of a downwardly inclined channel-shaped material discharge chute 26. The chute 26 extends from the back to the front of the dispensing section 14 and its rearmost end is accordingly uppermost.

The side of the channel formed discharge chute most adjacent the bin section 12 is adjacent, parallel to, and underlies the upper end of an overlapped conveyor belt 28. The belt 28 is formed to essentially bridge the space between the front wall 16 and the back wall 18 of the housing 10 and to provide the left side wall of the bin section 12.

The bottom of the bin section 12 is shown to provide a material supporting surface 32 which is inclined downwardly from right to left so as to form an angle with a horizontal which is in the neighborhood of 30°. The elevated right side edge of the surface 32 has a sealed connection with the right side wall 20, its front and rearmost edges respectively have a sealed connection with the front wall 16 and the back wall 18, and its left side edge underlies the lowermost end of the conveyor belt 28 and defines a line of separation between the bin section 12 and the dispensing section 14.

The outer material supporting surface of the conveyor belt 28 which at any one time defines the left side wall surface of the bin section 12 is oriented to form an angle with the surface 32 which, preferably, is in the neighborhood of 90°.

Belt 28 is a continuous loop-formed web which extends, at its lower end, about an idler roller 36 and at its upper end about a drive roller 38. The rollers 36 and 38 mount in a nested, parallel, longitudinally spaced, relation in a shallow frame 40. In a sense from front to back of the housing 10, the frame 40 is U-shaped in cross-section and its upturned sides 42 are respectively abutted and suitably secured to the front wall 16 and the back wall 18. The base plate 34 of the U-shaped frame 40 extends in an underlying closely spaced relation to the bottom run of continuous belt 28, from the lowermost edge of the surface 32 to the line of the uppermost right-hand edge (FIG. 2) of the discharge chute 26. The roller 36 is fixed on a shaft 44 the respective ends of which project to bearingly mount in brackets 67 provided on the inner surfaces of the sides 42 of the frame 40. The drive roller 38 has a fixed connection with a drive shaft 46. The upper end of each of the sides 42 of frame 40 has a longitudinally extending slot 43, each of the longitudinally extending edges of which is defined by an integrally connected guide plate 63. As here provided, the slots 43 are transversely aligned and commence at their lowermost ends at points immediately beyond the upper end of the base plate 34. Moreover the slots 43 are bridged at their uppermost ends by bars 55 which are fixed to the sides 42 of the frame 40 and have projected portions bear on and secured to the outer side wall 22 of the dispensing section 14 of the housing 10, at locations in spaced elevated relation to the upper end of the chute 26. Positioned in each of the slots 43 between and bearing on the spaced parallel guide plates 63 defining its side edges is a block-like member 47 which has an elongate generally rectangular configuration. The members 47 include external flanges which abut and bear on the inner faces of the frame sides 42. The members 47 also embody bearings 62 receiving and mounting for rotation therein and relative thereto projected portions of the shaft 46. The lowermost end of each block 47 is axially extended by an integrally connected, elongated, externally threaded element 51 having the form of a screw.

In each case the screw 51 is mounted to have its lowermost end project through a small bore passage in a block 49 fixed to the outer surface of the adjacent side 42 of the frame 40, at right angles to its included slot 43 and the member 47 which bears therein and for movement longitudinally of the guide plates 63. A nut 53 is threadedly engaged about each screw 51 above the block 49 and a second nut 53' is threadedly engaged about the scrw 51 below the block 49. As will be obvious, on backing up one of the nuts 53 or 53' and advancing the other with reference to the intermediate block 49, one may achieve a required longitudinal adjustment of the associated screw and the block 47 of which it forms an integrally connected part.

As will be observed in the drawings, suitable means will be provided to insure against endwise movement of the shaft 46 as one end thereof is projected in a sense outwardly and laterally of the frame 40 to fixedly mount at its projected extremity a drive sprocket 48.

Fixed and supported in underlying relation to the base plate ortion 34 of the frame 40 is a drive motor 50, the drive shaft 52 of which mounts in fixed relation thereto a drive sprocket 54. The sprockets 54 and 48 are arranged to be coplanar and are drivingly related by a continuous sprocket chain 56. As will be obvious, an energization of the motor 50 will cause a drive of the shaft 52 and, through the medium of the sprocket 54 and the chain 56, a drive of the shaft 46 and the roller 38 thereby. The belt 28 is driven upon rotation of the drive roller 38 by reason of the material and configuration of their bearingly related surface portions.

It should be self-evident that the spacing between the shaft 46 and the shaft 44 and the position of the shaft 46 with reference to the shaft 52 to provide an appropriate tension of the belt 28 and the chain 56 is readily facilitated by the manipulation of the nuts 53 and 53' in a manner believed obvious. The orientation of the conveyor belt 28 is in any case insured by reason of the containment of the members 47 between and in straight line bearing relation to the guide plates 43.

Fixed to the outer or material conveying surface of the belt 28 is a series of perpendicularly projected transversely disposed blade-like elements 58. The elements 58 are so arranged that there is one thereof at each of a plurality of longitudinally and equidistantly spaced locations, the length of the belt. The longitudinal extent of each blade 58 in the preferred embodiment illustrated has a dimension equal to that of approximately one-half the width of the belt 28. Moreover, each successive blade element 58 is located to be offset laterally relative the preceding and following blade element. One blade element 58, as shown, will have one end at one side edge of the belt 28 and extend laterally thereof to its mid-line and there terminate, while each of the preceding and following blade elements 58 extend from the opposite edge of the belt 28 to its mid-line. The offset nature and lateral extent of the blades 58 are effective in movement thereof in contact with a conglomerate mass of material in the bin section 12 to apply twisting and separating forces on the mass which separates elements thereof which have adhered or have tended to adhere to each other previous to or during the time of their storage. It will be noted that the support of the upper end of the frame 40 is reinforced by the application of additional barlike members 57 having a connection at their lowermost ends to the wall 22 in the dispensing section of the housing 10. Further, the chute 26 in the dispensing section is also appropriately connected to and supported on the wall structure 22. Additionally, the opening 24 in the housing 10 will normally be closed by a door 64 having a slot at which is presented the lowermost end of the discharge chute 26. Through this slot will be directed the discharge from the housing 10. Appropriate means are provided to cap this slot when the housing unit 10 and its contained apparatus is not in use. Where service openings are provided, the same will be sealed, conventionally, by releasably attached access panels.

Attention is directed to FIGS. 1 and 2 of the drawings which illustrate a box-like structure 30 capping the bin section 12 of the housing 10. The structure 30 is intended to enclose a refrigerating system of a conventional nature capable of delivering ice cubes into the bin section by way of an opening 31 (FIG. 2). Since the details of such a refrigerating unit are well known and form no particular part of the present invention, they are neither shown nor described. Any plumbing required will be placed in the wall structure of the housing 10 each element of which will, in preferred embodiments, include spaced parallel wall segments between which appropriate insulation will be provided.

The above described housing 10 and the structure embodied therein lends itself to a most efficient handling and dispensing of ice cubes. In use thereof, with the cube producing unit 30 in connection therewith, the unit 30 may be provided to be actuated at predetermined times or under predetermined conditions to conventionally operate to dispense ice cubes to the bin 12 by way of the opening 31 in the top thereof. As the ice cubes initially enter the bin 12 when the same is in an empty condition, they will hit the uppermost part of the bottom material supporting surface 32 and be carried downwardly to the lowermost end thereof and to the lowermost end of the conveyor belt 28. As the cubes continue to fall into the bin 12 they accumulate in a conglomerate mass and as the level thereof rises it will build up against the left-hand wall of the bin 12 defined by a portion of the material conveying surface of the belt 28 (FIG. 2). As noted in the first instance, when a storage of material embodying moisture must be effected in a conglomerate mass, elements thereof will tend to adhere to each other due to varying temperature conditions and heat transfer. To enable such material to be dispensed in a relatively individualized element form, the present invention provides that in the movement of the belt 28, as the motor 50 is energized to drive the roller 38, the offset, relatively spaced and perpendicularly projected blades 58 will apply points of pressure to the mass of material in the bin 12. These points of pressure are longitudinally and laterally displaced and applied against the left hand wall of the material in the bin in a manner to produce levering and twisting forces which tend to free the elements of the material, one from the other, particularly in the body of the material adjacent the belt 28. As the belt moves the blades function to not only separate and free ice cubes but to also serve as carriers through the medium of which the cubes are directed upwardly of the left side of the bin 12 and dropped into the chute 26, for discharge from the housing 10 under the influence of gravity. For this purpose a slot or opening is provided in the door 64. One may have a bagging arrangement in association with the discharge end of the chute 26 or its discharge may be simply directed to a portable receptable.

In accordance with the invention the unit 10 and its contained apparatus may serve as a central dispensing station in a hospital or like installation. In such case it may have in association therewith a mobile carrier and dispensing unit 11 such as illustrated in FIGS. 7 through 9 of the drawings. The mobile unit 11 comprises a generally rectangular shell-like housing structure 65. The uppermost portion of the housing 65 is formed as a temporary receiving and storage chamber 76 and its lowermost portion as a delivery chamber 68. The front wall of the latter has an opening through which a pail 74 may be inserted to seat vertically below a constricted opening at the dependent or discharge end of a chute structure 72. The uppermost end of the chute 72 rims an opening in and connects with the top wall 70 of the chamber 68. The wall 70 lies in a horizontal medial plane of the unit 11 and serves as the base of a rectangular shell-like superstructure including a back wall plate 75 and a front wall plate 90 which project perpendicular to the base 70 and in a spaced parallel relation. The upper edges of the plates 75 and 90 are bridged by a rectangular plate forming the top wall 92 of the unit 11. The rectangular shell-like superstructure is completed by plates forming parallel side walls 83. In the example illustrated, the plates 75, 83, 90 and 92 are all formed of clear glass or plastic material. This facilitates observation of the functional structure embodied in the unit 11.

Referring to FIGS. 7–9, the plate 75 which forms the back wall of the superstructure on the base 70 is provided with a laterally elongated slot 77 adjacent its upper edge. Connected to the interior surface of the plate 75 and bridging the side walls 83 is a plate 78 which forms a portion of the bottom wall structure of the receiving and storage chamber 76. The plate 78 is projected forwardly and inclined downwardly from the plate 75, in the direction of the plate which forms the front wall 90. A bar-like structure 80 in fixed connection with the inner surface of the front wall 90 at a location spaced forwardly from the projected end of the plate 78 embodies a resilient flap 82 which runs essentially from one side wall 83 to the other and depends to position in closely spaced relation to the inner surface of the front wall 90.

It will be noted that the horizontal cross section of the superstructure on the base 70 has a smaller dimension than that of the base 70. This provides that the base 70 forms a rectangular shoulder peripherally of the superstructure. Mounted on this shoulder, to the outer sides of the walls 83, are bearing blocks which receive and bearingly contain the projected remote extremities of pivot pin structure 93 forming part of a rotor 84 which is positioned between and in bridging relation to the side walls 83, at a location immediately adjacent the front wall 90. The rotor 84 is so located and sized as to also bridge the space between the forwardly projected extremity of the plate 78 and the flap 82. In this manner the bottom of the chamber 76 is made to comprise the sloped plate portion 78, the bar-like element 80 and its dependent flap 82 and the rotor 84. The remote end portions of the pivot structure 93 pass through seals in the appropriate apertures provided in the side walls 83 as they project to be supported in and by the aforementioned bearing blocks.

Referring to the full line position thereof illustrated in FIG. 9, it will be seen that the rotor 84 is provided, the length thereof, with a pie-shaped notch forming a wedge-shaped pocket 86 which is uppermost in the normal disposition of the rotor. It will be obvious that when ice cubes are delivered to the interior of the chamber 76 that they will initially glide, under the influence of gravity, down the plate 78, to be directed thereby to enter and first fill the pocket 86 before they commence to build up over the remainder of the bottom wall structure forming the base of the chamber 76. It will be noted that in the normal position of the rotor 84 the dependent extremity of the flap 82 is arranged to bear on and form a resilient seal with the outer surface portion of the rotor 84 immediately forward of its pocket 86. As seen, the dimension of the rotor 84 is such that its lowermost portion partially nests in the upper end of the chute structure 72.

One end of the pivot pin structure 93 is projected outwardly of its bearing block to mount and have fixed thereto a control arm 88. In the normal position of the rotor shown in full lines in FIG. 9, the arm 88 will project upwardly and incline slightly towards the back wall 75 of the superstructure portion of the unit 11. This inclination is limited and determined by the provision of an abutment device 97 in connection with the bearing block which is adjacent to and immediately inward of the arm 88.

It should be obvious that in order to direct a delivery of the measured charge of ice cubes in the pocket 86 to the pail 74 one need only pull the arm 88 forwardly and downwardly. This will cause the pocket to be inverted sufficiently that its contents will move, under the influence of gravity, to and through the chute 72 to the pail therebelow. A reverse movement of the arm 88 will return the pocket 86 to its normal position wherein it once more forms part of the bottom wall structure of the chamber 76. As the pocket is returned to its normal position, the contents of the chamber 76 will move to fill the same once more, in a manner believed obvious.

From the foregoing, the simplicity, efficiency and economy in fabrication and use of the housing unit 11 should be clear. As may be seen in FIGS. 7–9, moreover, the unit 11 is so designed that it may be backed up to the unit 10 so that the projected discharge end of the chute 26 may be presented in its inlet slot 77. When the unit 11 is so positioned and the motor 50 energized, the movement of the belt 28 and its integrated blade-like elements 58 will, as previously described, free, pick up and direct ice cubes from the bin 12 to the chamber 76 by way of the chute 26 and the slot 77. The cubes initially delivered to the chamber 76 will inherently follow the incline of the plate 78 to enter and lodge in the pocket 86 of the rotor 84. Following cubes will build up in the chamber 76 to the extent of its capacity. The motor 59 may be controlled to provide for its de-energization when the chamber 76 is essentially filled. By reason of the provision of casters 99 on the bottom of the unit 11, the unit, with its chamber 76 filled, may be moved at will to stations remote from the housing unit 10. When the unit 11 is brought to a remote station where a person or persons desire or require a measured charge of ice cubes, an operator need merely pull the handle 88 to provide for the delivery of a measured charge of cubes from the pocket 86 to a portable receptacle placed in the chamber 68 below the chute 72. In this manner one may utilize mobile units 11 to radiate from a central location housing the unit 10 and serve the needs of many in a manner that eliminates waste and maintains a high degree of control of the protection of ice cubes and their handling. As a matter of fact, in use of the invention apparatus there is no need for the direct handling of ice cubes in movement thereof from their source to their point of delivery and use. Sanitary conditions prevail throughout the procedure.

While it should be recognized that the unit 10 and mobile unit 11 may have independent utility, it nevertheless remains that their composite use, in association with each other, produces a highly economical, sanitary and effective vending and dispensing system for use in motels, hotels, hospitals and like installations where ice cubes or similar materials normally stored in a conglomerate mass must be delivered to a plurality of remote stations.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect and the invention is therefore claimed in any of its forms or modifications within the legitimate and valid scope of the appended claims.

The embodiments of the invention in which an exclusive property or privilege is claimed are defined as follows:

1. Vending and dispensing apparatus comprising a housing including a bin portion and a dispensing portion, said bin portion accommodating material to be dispensed as separated individual elements and existing in said bin in a manner form in which individual elements tend to adhere to one another, material delivery means in association with said bin portion operable to deliver said material from said bin portion to said dispensing portion and embodying means for applying twisting forces within said bin portion to influence elements of said mass of material therein to separate one from the other within said bin portion and to move said material including said separated elements to said dispensing portion for discharge from said housing.

2. Apparatus as in claim 1 characterized in that said material delivery means is oriented to move said material to said dispensing portion of said housing in a path which inclines upwardly from the bottom of said bin portion of said housing, and said material delivering means and the bottom of said bin portion providing material supporting surfaces substantially perpendicular to one another.

3. Apparatus as in claim 2 characterized in that said material delivery means is comprised of a continuous belt-like structure providing the said material supporting surface thereon and which inclines upwardly from the bottom of said bin portion of said housing and terminates in said dispensing portion of said housing, said continuous belt-like structure having projected from the material supporting surface thereof means to transmit twisting influences on portions of the mass of material in said bin portion in the course of movement of said belt-like structure as it is operated to deliver said material to said dispensing portion of said housing.

4. Apparatus as in claim 3 characterized in that said means projected from said belt-like structure includes portions in longitudinally spaced and laterally offset relation on said material supporting surface thereon.

5. Apparatus as in claim 4 characterized in that said belt-like structure is a loop-formed continuous web which, in effect, forms one side wall of said bin portion and provides that said one side wall of said bin portion is a moving surface which inclines upwardly and outwardly from the bottom of said bin portion and defines the said material supporting surface thereon.

6. Apparatus as in claim 4 characterized in that said means projected from said belt-like structure embodies blade-like projections at locations spaced longitudinally thereof the transverse extent of which correspond approximately to the width of said belt.

7. Apparatus as set forth in claim 6 characterized in that said blade-like projections comprise a longitudinally spaced series thereof each of which extends in a sense generally transverse to the belt and successive thereof, in a respectively longitudinally displaced relation, are respectively offset toward opposite sides of the belt.

8. Vending and dispensing apparatus as in claim 1 characterized by means in association with said housing for receiving and transporting the discharge from said material delivery means to locations remote from said housing, said receiving means including a temporary storage chamber having a wall portion thereof formed to include a pocket accommodating a portion of the material delivered to said temporary storage chamber, which wall portion is shiftable to provide for discharge of the pocket contents for use at one of said remote stations.

9. Vending and dispensing apparatus as in claim 8 characterized in that said receiving and transporting means is a mobile structure adapted to be positioned to have a passage therein in communication with said material delivery means in said housing to direct the discharged material to said temporary storage chamber, said temporary storage chamber including means automatically directing the first portion of the discharge from said housing to fill said pocket.

10. Apparatus as in claim 9 characterized in that said pocket is formed in the periphery of a rotor which per se forms a portion of the bottom of said temporary storage chamber and has in connection therewith means for rotation thereof to direct the contents of said pocket to a delivery chamber in said mobile structure, said mobile structure embodying wall structure forming said delivery chamber in the lower portion thereof, said rotor nesting, in part, in an opening in a partition spaced below the bottom wall structure of said temporary storage chamber of which it forms a part and said opening being rimmed by a dependent chute structure arranged to receive the discharge from the pocket in said rotor and to direct the same to a removable receptacle placed in said delivery chamber.

11. A system for the sanitary dispensing of ice cubes or like fragments in a hospital or like environment, including a central source station providing a housing enclosing a bin section and a discharge section in a side by side relation, said discharge section including a chute discharging to the exterior of the housing through an opening therein, selectively energizable means for carrying ice fragments from a supply in said bin section to said discharge section for discharge from said source station by way of said chute, a dispensing unit providing an enclosed storage chamber for ice fragments and selectively operable means for discharging quantities of ice fragments from said chamber, said dispensing unit being a mobile carrier readily movable from place to place where the use of ice fragments may be required, and said dispensing unit being structured to achieve in a position adjacent to said central source station a direct communication of said storage chamber therein with said discharge chute for filling and refilling said storage chamber, a wall portion of said dispensing unit defining said storage chamber providing an opening placed in communication with the housing opening by an appropriate positioning of said dispensing unit relative to said central source housing.

12. A system according to claim 11 wherein said discharge chute extends to and through the opening in said housing and in an appropriate positioning of said dispensing unit projects through the opening therein into said storage chamber.

13. A system according to claim 12, wherein said dispensing unit further includes a lower housing upon which said storage chamber mounts as a superstructure, said lower housing being mounted on wheels and providing an interior space accessible from outside the unit accommodating a removable receptacle, and said selectively operable means including a part positioning intermediate of said storage chamber and said interior space and normally preventing communication therebetween and another part operable from outside the unit to move the said first mentioned part to allow measured quantities of stored ice fragments to drop into said interior space and into a receptacle accommodated therein.

14. A system according to claim 11, characterized by ice fragment producing apparatus, said apparatus being enclosed in a box-like structure superposing over said bin section and aperture means within margins of said structure being provided for a protected admission of produced ice fragments to said bin section.

15. A system according to claim 14, said housing providing an inclined floor in said bin section, the relatively raised end of said floor underlying said aperture means.

16. A system according to claim 15, wherein said selectively energizable means for carrying ice fragments to said discharge section includes a loop defining continuous belt orienting in a position substantially perpendicular to said floor and appreciably offset from the relatively raised end of said floor toward the relatively lowered end thereof, a contained means of ice fragments being influenced by the inclination of said floor to bear against said belt, and a pattern of blades on said belt having the dual function of carrying ice fragments from said mass to said discharge section and of applying twisting forces to an engaged face of said mass freeing ice fragments from the mass and from one another.

* * * * *

UNITED STATES PATENT AND TRADEMARK OFFICE
CERTIFICATE OF CORRECTION

PATENT NO. : 4,060,111
DATED : November 29, 1977
INVENTOR(S) : Howard L. Burks

It is certified that error appears in the above—identified patent and that said Letters Patent are hereby corrected as shown below:

ABSTRACT: line 11, delete "be" (2nd occurrence).

Col. 1, line 6, "the" is to be inserted following "in".

Col. 5, line 9, "ortion" is corrected to read -- portion --.

Col. 9, line 23 (Claim 1, line 5), "manner" is corrected to read -- mass --.

Col. 12, line 13 (Claim 16, line 7), "means" is corrected to read -- mass --.

Signed and Sealed this

Twenty-eighth Day of February 1978

[SEAL]

Attest:

RUTH C. MASON
Attesting Officer

LUTRELLE F. PARKER
Acting Commissioner of Patents and Trademarks